(12) United States Patent
Zheng (10) Patent No.: US 9,355,230 B2
(45) Date of Patent: *May 31, 2016

(54) METHOD AND SYSTEM FOR CONTROLLING ACCESS TO APPLICATIONS ON MOBILE TERMINAL

(71) Applicant: TENCENT TECHNOLOGY (SHENZHEN) COMPANY LIMITED, Shenzhen (CN)

(72) Inventor: Xiaosheng Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/800,798

(22) Filed: Jul. 16, 2015

(65) Prior Publication Data

US 2015/0317470 A1    Nov. 5, 2015

Related U.S. Application Data

(63) Continuation of application No. 14/063,142, filed on Oct. 25, 2013, now Pat. No. 9,141,774, and a continuation of application No. PCT/CN2013/079131, filed on Jul. 10, 2013.

(30) Foreign Application Priority Data

Jul. 16, 2012 (CN) .......................... 2012 1 0245772

(51) Int. Cl.
  *G06F 21/30* (2013.01)
  *G06F 17/27* (2006.01)
  (Continued)

(52) U.S. Cl.
  CPC ............ *G06F 21/30* (2013.01); *G06F 17/2705* (2013.01); *G06F 17/30424* (2013.01);
  (Continued)

(58) Field of Classification Search
  CPC .............. G06F 21/30; G06F 17/30424; G06F 17/2705; G06F 21/629; G06F 21/36; G06F 21/6209; G06F 21/10; H04M 1/67
  See application file for complete search history.

(56) References Cited

U.S. PATENT DOCUMENTS

| 2003/0131282 A1 | 7/2003 | Lowen et al. | |
| 2005/0079896 A1* | 4/2005 | Kokko | G06F 3/0488 455/566 |

(Continued)

FOREIGN PATENT DOCUMENTS

| CN | 100561425 C | 11/2009 |
| CN | 101699835 A | 4/2010 |

(Continued)

OTHER PUBLICATIONS

Luo et al., Application Lockbox for Mobile Device Security, Apr. 2011, Eighth International Conference on Information Technology: New Generations, pp. 336-341.*

(Continued)

*Primary Examiner* — Kenneth Chang
(74) *Attorney, Agent, or Firm* — Anova Law Group, PLLC (57) ABSTRACT

Various embodiments provide methods and systems for controlling an access to applications on a mobile terminal. In an exemplary method, an opened application can be scanned and an application identification can be obtained. The application identification can be compared with a pre-stored target application identification. When the application identification is compared to be consistent with the pre-stored target application identification, an unlock interface can be displayed. An unlock command can be obtained to run the application on the mobile terminal. An exemplary system for controlling an access to an application on a mobile terminal can include a scanning module, a comparing module, a displaying module, and an executing module.

17 Claims, 3 Drawing Sheets

(51) Int. Cl.
  *G06F 17/30* (2006.01)
  *G06F 21/10* (2013.01)
  *G06F 21/36* (2013.01)
  *G06F 21/62* (2013.01)
  *H04M 1/67* (2006.01)

(52) U.S. Cl.
  CPC .............. *G06F21/10* (2013.01); *G06F 21/36* (2013.01); *G06F 21/6209* (2013.01); *G06F 21/629* (2013.01); *H04M 1/67* (2013.01)

(56) References Cited

U.S. PATENT DOCUMENTS

| | | | |
|---|---|---|---|
| 2006/0026689 A1* | 2/2006 | Barker | G06F 21/31 726/26 |
| 2006/0059486 A1 | 3/2006 | Loh et al. | |
| 2006/0132060 A1* | 6/2006 | Chen | G06F 1/3203 315/291 |
| 2006/0277402 A1 | 12/2006 | Wakabayashi | |
| 2008/0136587 A1 | 6/2008 | Orr | |
| 2008/0274716 A1 | 11/2008 | Fok et al. | |
| 2009/0006991 A1 | 1/2009 | Lindberg et al. | |
| 2009/0215489 A1 | 8/2009 | Kerdraon et al. | |
| 2010/0211872 A1 | 8/2010 | Rolston et al. | |
| 2011/0088086 A1 | 4/2011 | Swink et al. | |
| 2012/0054841 A1 | 3/2012 | Schultz et al. | |
| 2012/0090033 A1 | 4/2012 | Kelly et al. | |
| 2013/0078948 A1 | 3/2013 | Pecen et al. | |
| 2013/0326358 A1 | 12/2013 | Scarborough | |

FOREIGN PATENT DOCUMENTS

| | | |
|---|---|---|
| CN | 101916196 A | 12/2010 |
| CN | 102104671 A | 6/2011 |
| CN | 102842007 A | 12/2012 |

OTHER PUBLICATIONS

The World Intellectual Property Organization (WIPO) International Search Report for PCT/CN2013/079131 Sep. 19, 2013.

* cited by examiner

METHOD AND SYSTEM FOR CONTROLLING ACCESS TO APPLICATIONS ON MOBILE TERMINAL

CROSS-REFERENCES TO RELATED APPLICATIONS

This application is a continuation application of U.S. patent application No. 14/063,142, filed on Oct. 25, 2013. U.S. patent application No. 14/063,142 is a continuation application of PCT Patent Application No. PCT/CN2013/079131, filed on Jul. 10, 2013, which claims priority to Chinese Patent Application No. CN 201210245772.2, filed on Jul. 16, 2012, the entire content of which are incorporated herein by reference.

FIELD OF THE DISCLOSURE

The present disclosure generally relates to the field of security of mobile terminals, and particularly, relates to methods and systems for controlling an access to applications on a mobile terminal.

BACKGROUND

With development of computer technology, mobile terminals are becoming increasingly popular. To meet user experience requirements, various applications are installed on a mobile terminal. These applications may contain personal information of a user. Such personal information is confidential and not supposed to be known by others. Therefore, security for accessing applications on the mobile terminal becomes more and more important.

For example, various applications may be installed on a mobile phone based on an Android platform. These applications may be used to check call records and/or personal information records, to check multimedia resources, to view an album, etc. In many cases, these applications may be easily accessed. When the phone is lost but found by others or is borrowed by others, the owner's personal/profile information may be viewed by others. In other words, the owner's personal or profile information is not effectively protected.

It is therefore desirable to provide methods and systems for controlling access to applications on a mobile terminal to ensure security of applications on the mobile terminal.

BRIEF SUMMARY OF THE DISCLOSURE

According to various embodiments, there is provided a method for controlling an access to an application on a mobile terminal. In this method, an opened application can be scanned and an application identification can be obtained. The application identification can be compared with a pre-stored target application identification. An unlock interface can be displayed, when the application identification is compared to be consistent with the pre-stored target application identification. An unlock command can be obtained to run the application on the mobile terminal.

According to various embodiments, there is also provided a system for controlling an access to an application on a mobile terminal. The system can include a scanning module, a comparing module, a displaying module, and an executing module. The scanning module can be configured to scan an opened application and to obtain an application identification. The comparing module can be configured to compare the application identification with a pre-stored target application identification. The displaying module can be configured to display an unlock interface, when the application identification is compared to be consistent with the pre-stored target application identification. The executing module can be configured to obtain an unlock command to run the application.

According to various embodiments, there is also provided a non-transitory computer readable medium. The computer readable medium contains computer program, when being executed by a processor of a mobile terminal, for performing a method for controlling an access to an application on the mobile terminal. The method includes scanning an opened application and obtaining an application identification and comparing the application identification with a pre-stored target application identification. The method also includes displaying an unlock interface, when the application identification is compared to be consistent with the pre-stored target application identification, and obtaining an unlock command to run the application on the mobile terminal.

In this manner, the disclosed methods and systems for controlling an access to applications on a mobile terminal can compare an application identification after scanning with a pre-stored target application identification. When the scanned application identification is consistent with or matches with the pre-stored target application, an unlock interface can be displayed. After unlocked by obtaining an unlock command on the unlock interface, corresponding applications can then be run on the unlock interface. Security for accessing the applications can be improved. Data security of the mobile terminal can be ensured.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
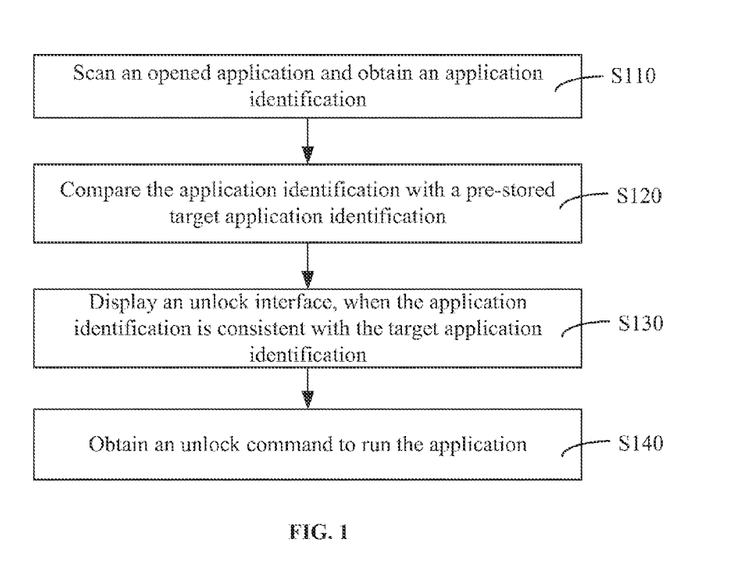
FIG. 1 depicts an exemplary method for controlling access to an application on a mobile terminal in accordance with various disclosed embodiments.

FIG. 1 depicts an exemplary method for controlling access to an application on a mobile terminal in accordance with various disclosed embodiments. In Step S110, an opened application can be scanned and an application identification can be obtained. For example, various methods can be used to scan a running application to obtain the identification of the running application.

In an exemplary method for scanning an opened or running application, a stack top of a stack of a view interface can be scanned at a scheduled time (e.g., periodically or regularly) and an identification of an opened application can be obtained. For example, a time interval for scanning at the scheduled time can be set as needed. In an example, the time interval for scanning can be about 0.1 second or about 0.5 second or about any other suitable time length. In order to perform the scanning at the scheduled time, once a device system such as an Android system starts up, a thread can be opened in a back-stage. Using a thread loop, the stack top of the stack of the view interface can be continuously scanned within a short time interval.

For example, an ActivityManager (e.g., a view management tool) can be used to obtain a topActivity (e.g., the current view interface) of currently-running programs/tasks, for example, using getRunningTasks (e.g., a tool for obtaining a task collection). The identification of the opened application (or application identification) and a name of the Activity (or Activity name) can then be obtained via the topActivity. The application identification can include, for example, an application name, an application ID (i.e., identity), and/or a combination thereof. In one embodiment, the Acitivity name can be a name of an application interface. Each of the applications can have multiple interfaces and each interface can correspond to an Acitivity (e.g., a view interface).

Another exemplary method for scanning an opened or running application can include monitoring logs; parsing (or interpreting) information of startup items in the logs, and obtaining an identification of the opened application. For example, when an Android system starts up, logs related to an Activitymanager can be generated. The log can contain a Starting or a START (e.g., including startup items), the identification of the opened application (or the application identification), and an Activity name.

Therefore, a thread can be opened in the back-stage to monitor a logcat and to detect the log that indicates the application to start. When the logcat is detected, each line of information in the logcat can be parsed (or interpreted), a "cmp" location at the first occurrence in the logcat can be positioned. A character string intercepted from the positioned location can include the application identification and/or the currently displayed Activity name. Information of the startup items can include the application identification of the startup, the Activity name, etc.

In Step S120, the application identification is compared with a pre-stored target application identification.

For example, the pre-stored target application identification refers to a selected application identification that requires for application security and confidentiality. The target application identification can include a name of the target application, a target application ID, and/or a combination thereof. The (scanned) application identification can contain content(s) the same as or otherwise consistent with the content(s) contained in the pre-stored target application identification. Accordingly, if the target application contains a name of the target application, the application identification can contain a name of the application for comparison.

In Step S130, when the application identification is compared to be consistent with the target application identification, an unlock interface is displayed.

For example, the application identification and the target application identification can be compared with each other. If they are consistent with each other, the unlock interface can be displayed. In one embodiment, the application identification can contain an application name, and the application name can include a character string. Names of pre-stored target applications can be stored in a memory list. The character string of the name of the scanned application can be compared one by one with character strings of names of the target applications in the memory list. If they are consistent with each other, the unlock interface can be displayed.

Further, in other embodiments, the application identification may include an application ID, and target application IDs can be stored in the memory list. The application ID can be compared one by one with the target application IDs stored in memory list. When they are consistent with each other, the unlock interface can be displayed. Alternatively, the application identification may include an application ID and an application name, and target application IDs and names are stored together in the memory list. The application ID and name can be compared one by one with the target application IDs and names stored in the memory list. If the application ID and a target application ID are consistent with each other and the scanned application name matches with a target application name, the unlock interface can be displayed.

The unlock interface can include an unlock interface for inputting a password and/or an unlock interface for sliding a pattern on the unlock interface. The unlock interface for inputting the password may display an inputting box, numbers, letters, keys, etc. For example, the password can be numbers, letters, or a combination of numbers and letters. In an exemplary embodiment, the password can be formed by a combination of from about 1 to about 16 digits without limitation. On the other hand, the unlock interface for sliding a pattern on the unlock interface can use a default pattern to unlock the application.

Figure 2:
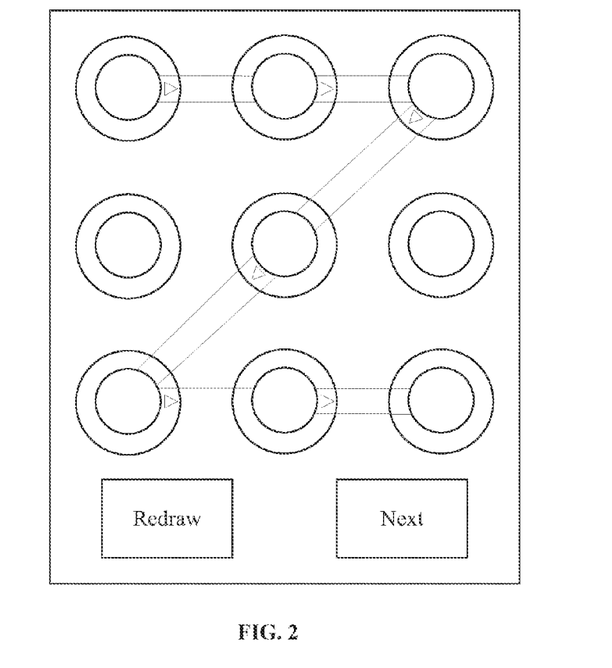
FIG. 2 depicts an exemplary method for setting a sliding pattern for unlocking an application on a mobile terminal in accordance with various disclosed embodiments.

FIG. 2 depicts an exemplary method for unlocking a password by sliding a pattern on an unlock interface. As shown in the example of FIG. 2, the pattern set for sliding (or the sliding pattern) can be an unlock pattern set according to a "Z" shaped pattern for sliding thereon to unlock the application. Such sliding pattern to unlock the application can be recorded. In addition, a "Redraw" control and a "Next" notification control can also be shown on the exemplary unlock interface shown in FIG. 2.

Figure 3:
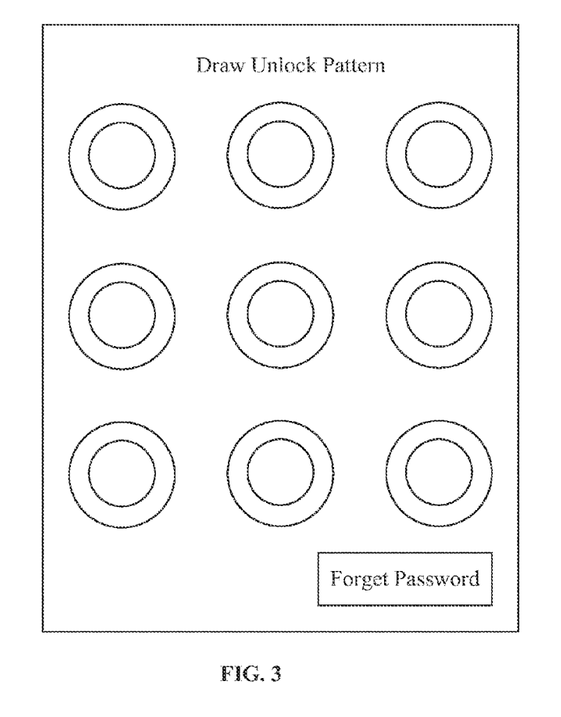
FIG. 3 depicts an exemplary unlock interface having a sliding pattern in accordance with various disclosed embodiments.

FIG. 3 depicts another exemplary unlock interface having a pattern for sliding (or a sliding pattern). On the exemplary unlock interface, a "Draw Unlock Pattern" notification and a "Forgot Password" control can be set. If a mobile drawn pattern is correct, the password can be unlocked and the application can be accessed.

Referring back to FIG. 1, in Step S140, an unlock command can be obtain to run the application. For example, the unlock command can be generated by inputting the password on the unlock interface (or a password interface); while the unlock command can also be generated by the mobile drawn pattern inputted by sliding a pattern on the unlock interface.

Further, in one embodiment, the method for controlling access to the application on the mobile terminal can further include: stopping scanning application(s) when it is detected that the screen of the mobile phone is off or the mobile phone is on a standby mode. For example, during a scanning process when it is detected that a screen of the mobile terminal is off or the mobile phone is on a standby mode, that is, no new applications are being opened, application scanning can be stopped at this time. This can save power used for scanning applications on the mobile phone.

Figure 4:
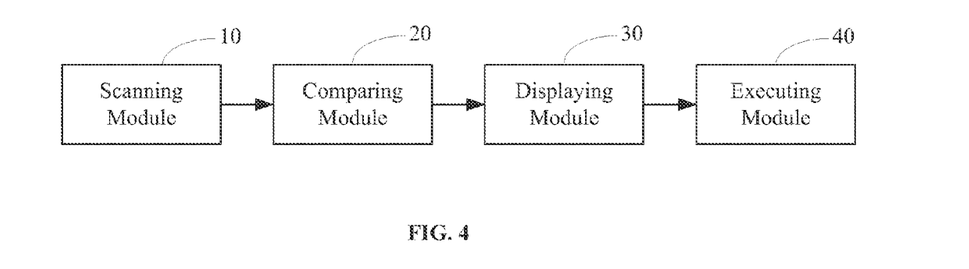
FIG. 4 depicts an exemplary system for controlling access to an application on a mobile terminal in accordance with various disclosed embodiments.

FIG. 4 depicts an exemplary system for controlling access to an application on a mobile terminal. The exemplary system can include a scanning module 10, a comparing module 20, a displaying module 30, and/or an executing module 40.

The scanning module 10 can be configured to scan an opened application or a running application to obtain an application identification.

Figure 5:
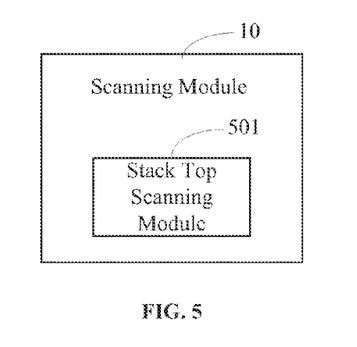
FIG. 5 depicts an exemplary scanning module in accordance with various disclosed embodiments.

As shown in FIG. 5, the scanning module 10 includes a stack top scanning module 501. The stack top scanning module 501 can be used to scan, at a scheduled time (e.g., periodically or regularly), a stack top of a stack of a view interface to obtain an identification of the opened application. A time interval for scanning at the scheduled time can be set as needed. In an example, the time interval for scanning can be about 0.1 second or about 0.5 second or about any other suitable time length. In order to perform the scanning at the scheduled time, once a device system such as an Android system starts up, a thread can be opened in a back-stage. Using a thread loop, the stack top of the stack of the view interface can be continuously scanned within a short time interval.

For example, an ActivityManager (e.g., a view management tool) can be used to obtain a topActivity (e.g., the current view interface) of currently-running programs/tasks, for example, using getRunningTasks (e.g., a tool for obtaining a task collection). The identification of the opened application (or application identification) and a name of the Activity (or Activity name) can then be obtained via the topActivity. The application identification can include, for example, an application name, an application ID (i.e., identity), and/or a combination thereof. In one embodiment, the Acitivity name can be a name of an application interface. Each of the applications can have multiple interfaces and each interface can correspond to an Acitivity (e.g., a view interface).

Figure 6:
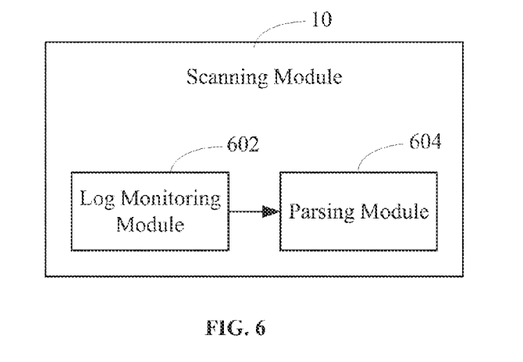
FIG. 6 depicts another exemplary scanning module in accordance with various disclosed embodiments.

In FIG. 6, in one embodiment, the scanning module 10 includes a log monitoring module 602 and a parsing module 604. The log monitoring module 602 can be used to monitor the log. The parsing module 604 can be used to parse (or interpret) information of startup items in the logs, and to obtain an identification of the opened application. For example, when an Android system starts up, logs related to an Activitymanager can be generated. The log can contain a Starting or a START (e.g., including startup items), the identification of the opened application (or the application identification), and an Activity name.

Therefore, a thread can be opened in the back-stage to monitor a logcat and to detect the log that indicates the application to start. The log monitoring module 602 can be the thread used to monitor the logcat. The log monitoring module 602 can detect a logcat, while the parsing module 604 can parse (or interpret) each line of information in the logcat and position a location of the logcat that the first time a "cmp" occurs. A string intercepted from the positioned location can be the application identification and the currently displayed Activity name. The information of the startup item can include the application identification of the startup, Activity name, etc. A character string intercepted from the positioned location can include the application identification and/or the currently displayed Activity name. Information of the startup items can include the application identification of the startup, the Activity name, etc.

The comparing module 20 can be configured to compare the application identification with a pre-stored target application identification.

For example, the pre-stored target application identification refers to a selected application identification that requires for application security and confidentiality. The target application identification can include a name of the target application, a target application ID, and/or a combination thereof. The (scanned) application identification can contain content(s) the same as or otherwise consistent with the content(s) contained in the pre-stored target application identification. Accordingly, if the target application contains a name of the target application, the application identification can contain a name of the application for comparison.

The displaying module 30 can be configured to display an unlock interface, when the application identification is consistent with the target application identification.

In one embodiment, the application identification can contain an application name, and the application name can include a character string. Names of pre-stored target applications can be stored in a memory list. The comparing module 20 can be configured to compare the character string of the application name one by one with character strings of names of the target applications in the memory list. If they are consistent with each other, the displaying module 30 can be configured to display the unlock interface.

Further, in other embodiments, the application identification may include an application ID, and target application IDs can be stored in the memory list. The application ID can be compared one by one with the target application IDs stored in memory list. When they are consistent with each other, the unlock interface can be displayed. Alternatively, the application identification may include an application ID and an application name, and target application IDs and names are stored together in the memory list. The application ID and name can be compared one by one with the target application IDs and names stored in the memory list. If the application ID and a target application ID are consistent with each other and the scanned application name matches with a target application name, the unlock interface can be displayed.

The unlock interface can include an unlock interface for inputting a password and/or an unlock interface for sliding a pattern on the unlock interface. The unlock interface for inputting the password may display an inputting box, numbers, letters, keys, etc. For example, the password can be numbers, letters, or a combination of numbers and letters. In an exemplary embodiment, the password can be formed by a combination of from about 1 to about 16 digits without limitation. On the other hand, the unlock interface for sliding a pattern on the unlock interface can use a default pattern to unlock the application, for example, as depicted in FIGS. 2-3.

The executing module 40 is configured to obtain an unlock command to run the application. For example, the unlock command can be generated by inputting the password on the unlock interface (or a password interface); while the unlock command can also be generated by the mobile drawn pattern inputted by sliding a pattern on the unlock interface.

Further, in one embodiment, the application scanning can be stopped, when the scanning module 10 detects that the screen of the mobile phone is off or the mobile phone is on a standby mode. For example, during a scanning process when it is detected that a screen of the mobile terminal is off or the mobile phone is on a standby mode, that is, no new applications are opened or running, the application scanning can be stopped at this time. This can save power used for scanning applications on the mobile phone.

The disclosed methods and systems for controlling access to an application on a mobile terminal can compare an application identification with a pre-stored target application identification. When the application identification is consistent with the pre-stored target application, an unlock interface can be displayed. Only after an unlock command is obtained to unlock the password on the unlock interface, corresponding application can be access. Security for accessing applications can be improved. Data security within the mobile terminal can be ensured.

In addition, compared with continuously checking a stack top of an identification application, log scanning can save power and extend use time of the mobile terminal. Application scanning can be stopped to save power for scanning, when the screen of the mobile terminal is off or when the mobile terminal is on a standby mode. It is user-friendly to provide various options for users to choose, e.g., by providing an unlock interface for inputting a password and by providing an unlock interface for sliding a pattern thereon.

Figure 7:
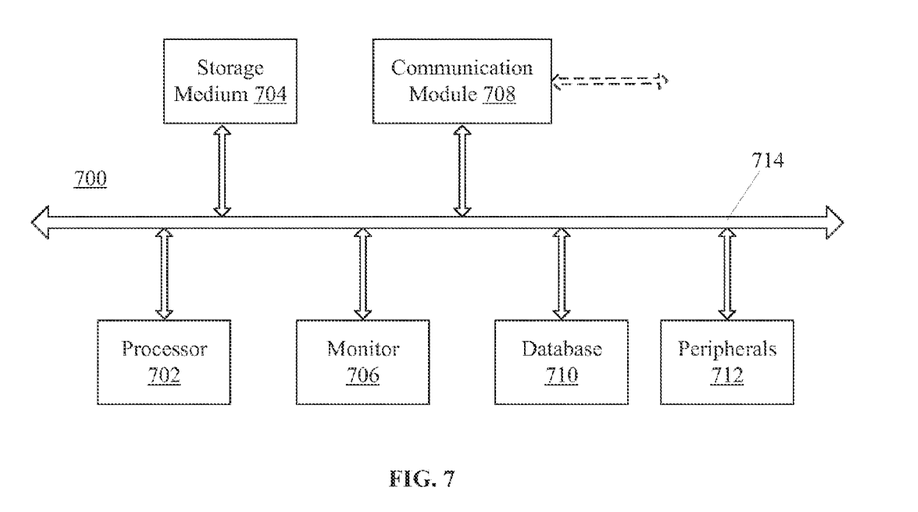
FIG. 7 shows a block diagram of an exemplary computing system capable of implementing a mobile terminal in accordance with various disclosed embodiments.

In various embodiments, the mobile terminal may be implemented on any appropriate computing platform. FIG. 7 shows a block diagram of an exemplary computing system 700 capable of implementing the mobile terminal. The computing system 700 may include a processor 702, a storage medium 704, a monitor 706, a communication module 708, a database 710, and peripherals 712. Certain devices may be omitted and other devices may be included.

Processor 702 may include any appropriate processor or processors. Further, processor 702 can include multiple cores for multi-thread or parallel processing. Storage medium 704 may include memory modules, such as ROM, RAM, and flash memory modules, and mass storages, such as CD-ROM, U-disk, hard disk, etc. Storage medium 704 may store computer programs for implementing various processes, when executed by processor 702.

Further, peripherals 712 may include I/O devices such as keyboard and mouse, and communication module 708 may include network devices for establishing connections through a wireless or wired communication network. Database 710 may include one or more databases for storing certain data and for performing certain operations on the stored data, such as database searching.

In various embodiments, the disclosed modules for the exemplary system as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

The disclosed embodiments can be examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software products only. The software products can be stored in a storage medium. The software products can include suitable commands to enable any client device (e.g., including a mobile phone, a personal computer, a server, or a network device, etc.) to implement the disclosed embodiments.

Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and systems for controlling an access to applications on a mobile terminal can compare an application identification after scanning, with a pre-stored target application identification. When the scanned application identification is consistent with or matches with the pre-stored target application, an unlock interface can be displayed. After unlocked by obtaining an unlock command on the unlock interface, corresponding applications can then be run on the unlock interface. Security for accessing the applications can be improved. Data security of the mobile terminal can be ensured.

In an exemplary method for controlling an access to an application on a mobile terminal, an opened application can be scanned and an application identification can be obtained. The application identification can be compared with a pre-stored target application identification. An unlock interface can be displayed, when the application identification is compared to be consistent with the pre-stored target application identification. An unlock command can be obtained to run the application on the mobile terminal.

An exemplary system for controlling an access to an application on a mobile terminal can include a scanning module, a comparing module, a displaying module, and an executing module. The scanning module can be configured to scan an opened application and to obtain an application identification. The comparing module can be configured to compare the application identification with a pre-stored target application identification. The displaying module can be configured to display an unlock interface, when the application identification is compared to be consistent with the pre-stored target application identification. The executing module can be configured to obtain an unlock command to run the application.

What is claimed is:

1. A method for controlling an access to an opened application on a mobile terminal, comprising:
    scanning the opened application and obtaining an application identification at a scheduled time based on a set time interval for scanning;
    comparing the application identification with a plurality of pre-stored target application identifications stored in a memory list, wherein each pre-stored target application identification includes at least one of a name of a target application and a target application ID, and pre-stored target applications refer to applications that require application security and confidentiality;
    displaying an unlock interface, when the application identification is consistent with one of the pre-stored target application identifications;
    obtaining an unlock command to access the opened application on the mobile terminal; and
    stopping scanning of the opened application on the mobile terminal to save power when detecting a screen of the mobile terminal is off or the mobile terminal is on a standby mode.

2. The method according to claim 1, wherein the scanning of the opened application and the obtaining of the application identification comprise:
    scanning a stack top of a stack of a view interface of the application to obtain the application identification.

3. The method according to claim 1, wherein the scanning of the opened application and the obtaining of the application identification comprise:
    monitoring logs;
    parsing information of startup items in the logs; and
    obtaining the application identification.

4. The method according to claim 1, wherein the unlock interface comprises an unlock interface for inputting a password, an unlock interface for sliding a pattern on the unlock interface, and a combination thereof.

5. The method according to claim 1, wherein the scanning of the opened application comprises:
scanning a stack top of a stack of a view interface of the application at a scheduled time by setting a time interval for scanning.

6. The method according to claim 1, wherein the comparing of the application identification with the pre-stored target application identifications comprises at least one of:
comparing a character string of a name of the application one by one with character strings of the names of the target applications in the memory list;
comparing an application ID of the application identification one by one with the application IDs of the target applications in the memory list; and
comparing an application ID and a character string of a name of the application identification one by one with character strings of the application IDs and the names of target applications in the memory list.

7. A system for controlling an access to an opened application on a mobile terminal, comprising:
one or more processors in the mobile terminal;
memory in the mobile terminal; and
one or more program modules stored in the memory and to be executed by the one or more processors, the one or more program modules including:
a scanning module, configured to scan the opened application and obtain an application identification at a scheduled time based on a set time interval for scanning;
a comparing module, configured to compare the application identification with a plurality of pre-stored target application identifications stored in a memory list, wherein each pre-stored target application identification includes at least one of a name of a target application and a target application ID, and pre-stored target applications refer to applications that require application security and confidentiality;
a displaying module, configured to display an unlock interface, when the application identification is consistent with one of the pre-stored target application identifications; and
an executing module, configured to obtain an unlock command to access the opened application; and
wherein the scanning module is further configured to stop scanning of the opened application on the mobile terminal to save power when detecting a screen of the mobile terminal is off or the mobile terminal is on a standby mode.

8. The system according to claim 7, wherein the scanning module comprises:
a stack top scanning module, configured to scan a stack top of a stack of a view interface of the application to obtain the application identification.

9. The system according to claim 7, wherein the scanning module comprises:
a log monitoring module, configured to monitor logs; and
a parsing module, configured to parse information of startup items in the logs and to obtain the application identification.

10. The system according to claim 7, wherein the unlock interface comprises an unlock interface for inputting a password, an unlock interface for sliding a pattern on the unlock interface, and a combination thereof.

11. The system according to claim 7, wherein the scanning module is configured to scan a stack top of a stack of a view interface of the application at a scheduled time by setting a time interval for scanning.

12. The system according to claim 7, wherein the comparing module is configured to conduct at least one of:
compare a character string of a name of the application one by one with character strings of the names of the target applications in the memory list;
compare an application ID of the application identification one by one with the application IDs of the target applications in the memory list; and
compare an application ID and a name of the application identification one by one with character strings of the application IDs and the names of the target applications in the memory list.

13. A non-transitory computer readable medium having computer programs, when being executed by a processor of a mobile terminal, for performing a method for controlling an access to an opened application on the mobile terminal, the method comprising:
scanning the opened application and obtaining an application identification at a scheduled time based on a set time interval for scanning;
comparing the application identification with a plurality of pre-stored target application identifications stored in a memory list, wherein each pre-stored target application identification includes at least one of a name of a target application and a target application ID, and pre-stored target applications refer to applications that require application security and confidentiality;
displaying an unlock interface, when the application identification is consistent with one of the pre-stored target application identifications;
obtaining an unlock command to access the opened application on the mobile terminal; and
stopping scanning of the opened application on the mobile terminal to save power when detecting a screen of the mobile terminal is off or the mobile terminal is on a standby mode.

14. The computer readable medium according to claim 13, wherein the scanning of the opened application and the obtaining of the application identification comprise:
scanning a stack top of a stack of a view interface of the application at a scheduled time by setting a time interval for scanning to obtain the application identification.

15. The computer readable medium according to claim 13, wherein the scanning of the opened application and the obtaining of the application identification comprise:
monitoring logs;
parsing information of startup items in the logs; and
obtaining the application identification.

16. The computer readable medium according to claim 13, wherein the unlock interface comprises an unlock interface for inputting a password, an unlock interface for sliding a pattern on the unlock interface, and a combination thereof.

17. The computer readable medium according to claim 13, wherein the comparing of the application identification with the pre-stored target application identification comprises at least one of:
comparing a character string of a name of the application one by one with character strings of the names of the target applications in the memory list;
comparing an application ID of the application identification one by one with the application IDs of the target applications in the memory list; and comparing an application ID and a name of the application identification one by one with character strings of the application IDs and the names of the target applications in the memory list.

\* \* \* \* \*